(12) United States Patent
Tanaka

(10) Patent No.: US 7,486,112 B2
(45) Date of Patent: Feb. 3, 2009

(54) OUTPUT BUFFER CIRCUIT WITH DE-EMPHASIS FUNCTION

(75) Inventor: Makoto Tanaka, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 362 days.

(21) Appl. No.: 11/498,084

(22) Filed: Aug. 3, 2006

(65) Prior Publication Data

US 2007/0050572 A1 Mar. 1, 2007

(30) Foreign Application Priority Data

Aug. 23, 2005 (JP) ............................ 2005-240775

(51) Int. Cl.
*H03K 19/0175* (2006.01)
(52) U.S. Cl. ............................ 326/83; 326/68; 327/108
(58) Field of Classification Search ............. 326/82–83, 326/86–87, 68; 327/108, 109, 333
See application file for complete search history.

(56) References Cited

U.S. PATENT DOCUMENTS 6,897,685 B2 *  5/2005  Sato ............................ 326/86
7,030,657 B2 *  4/2006  Stojanovic et al. ............ 326/87
7,348,794 B2 *  3/2008  Tanaka ......................... 326/26

FOREIGN PATENT DOCUMENTS

JP   2002-94365   3/2002
JP   2004-88693   3/2004

* cited by examiner

*Primary Examiner*—James H Cho
(74) *Attorney, Agent, or Firm*—McGinn IP Law Group, PLLC (57) ABSTRACT

Disclosed is an output buffer circuit including main-data output buffers; a de-emphasis output buffer; and a selector that performs switching control in such a way that, based on a control signal indicating whether de-emphasis is to be enabled or disabled, main data is supplied to the de-emphasis output buffer to make the buffer operate as a main-data output buffer when the control signal indicates that de-emphasis is to be disabled, while emphasis data obtained on delaying the main data by the delay circuit is supplied to the de-emphasis output buffer to make the buffer operate as a de-emphasis output buffer when the control signal indicates that de-emphasis is to be enabled.

8 Claims, 5 Drawing Sheets

OUTPUT BUFFER CIRCUIT WITH DE-EMPHASIS FUNCTION

FIELD OF THE INVENTION

The present invention relates to a semiconductor circuit, and more particularly to an output buffer circuit with the de-emphasis function.

BACKGROUND OF THE INVENTION

Patent Documents 1 and 2 disclose an output buffer equipped with de-emphasis function in which the amplitude of an output signal emphasized when the logic of the output signal is changed, is attenuated when the logic of the output signal following the change remains unchanged. Patent document 1 discloses a configuration including a main buffer, a delay circuit, an emphasis driver, and a subtracter composed of a differential circuit. Patent Document 2 discloses an emphasis circuit constituted by a CMOS inverter, with a configuration including a tri-state buffer that performs switching control to determine whether to activate the emphasis function based on the control signal.

Figure 8:
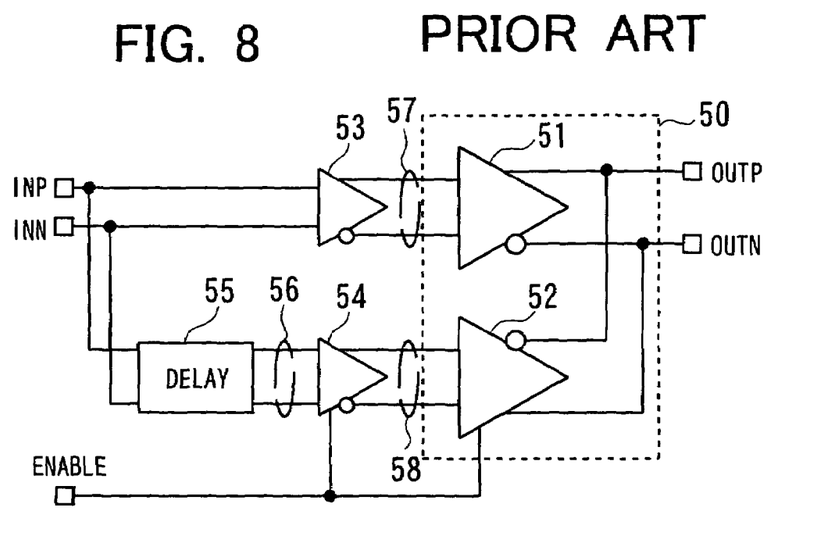
FIG. 8 is a diagram showing a conventional circuit.

FIG. 8 is a diagram showing the configuration of an output buffer circuit equipped with a conventional de-emphasis function. For the sake of description, the following describes an exemplary configuration in which the ENABLE signal is introduced into the configuration (differential circuit), described in Patent Document 1, as the control signal for activating the emphasis function. Patent Documents 1 and 2 disclose an output buffer having the pre-emphasis function, which emphasizes the amplitude at the transition bit that is the first bit immediately after the logic of the signal is changed, and the de-emphasis function which decreases the emphasized amplitude when the logic of the bits following the transition bit is not changed. The following describes an output buffer with the de-emphasis function that outputs the amplitude defined by the power supply potential VDD in the transition bit and decreases the amplitude when the logic of the bit following the transition bit is not changed.

Referring to FIG. 8, the output buffer circuit comprises a pair of differential input terminals (INP/INN) that differentially receive a data signal; a main-data pre-buffer 53 that receives the differential signal input at the differential input terminals (INP/INN); a main-data main buffer 51 that receives a differential output 57 from the main-data pre-buffer 53; a delay circuit 55 that receives the differential signal input at the differential input terminals (INP/INN), delays the signal, and differentially outputs the delayed signal; a de-emphasis pre-buffer 54 that differentially receives an output 56 from the delay circuit 55; and a de-emphasis main buffer 52 that differentially receives an output 58 from the de-emphasis pre-buffer 54. The non-inverting output from the main-data main buffer 51 and the inverting output (indicated by a circle) from the de-emphasis main buffer 52 are connected in common to a non-inverting output terminal OUTP. The inverting output from the main-data main buffer 51 and the non-inverting output from the de-emphasis main buffer 52 are connected in common to an inverting output terminal OUTN. The de-emphasis pre-buffer 54 and the de-emphasis main buffer 52 become active and operable when they receive the control signal ENABLE that is active, and becomes inactive when the control signal ENABLE is inactive.

The main-data main buffer 51 and the de-emphasis main buffer 52 emphasize the amplitude of a signal for output when the signal to be output (OUTP/OUTN) undergoes the change of the logic.

When de-emphasis is disabled, the control signal ENABLE deactivates the de-emphasis main buffer 52 and the de-emphasis pre-buffer 54. In this case, the main-data main buffer 51 has a driving-capability of driving a transmission line alone (balanced transmission line connected to OUTP and OUTN).

The amplitude of the transition bit, which is the first bit signal immediately after the logic of the signal output from the main buffer 50 (OUTP/OUTN) is changed, is fixed regardless of whether de-emphasis is enabled or disabled. The waveform is emphasized by attenuating the amplitude of non-transition bits that are the signals following the transition bit. For example, when the output signal level VOH of the transition bit, generated immediately after the signal level is changed from low to high, is the power supply potential VDD and the following bit (non-transition bit) is high, the amplitude VOH of this signal is set lower than VDD. When the output signal level VOL of the transition bit, generated immediately after the signal level is changed from high to low, is the GND level and the following bit (non-transition bit) is low, the amplitude VOL of this signal is raised higher than GND.

Figure 9:
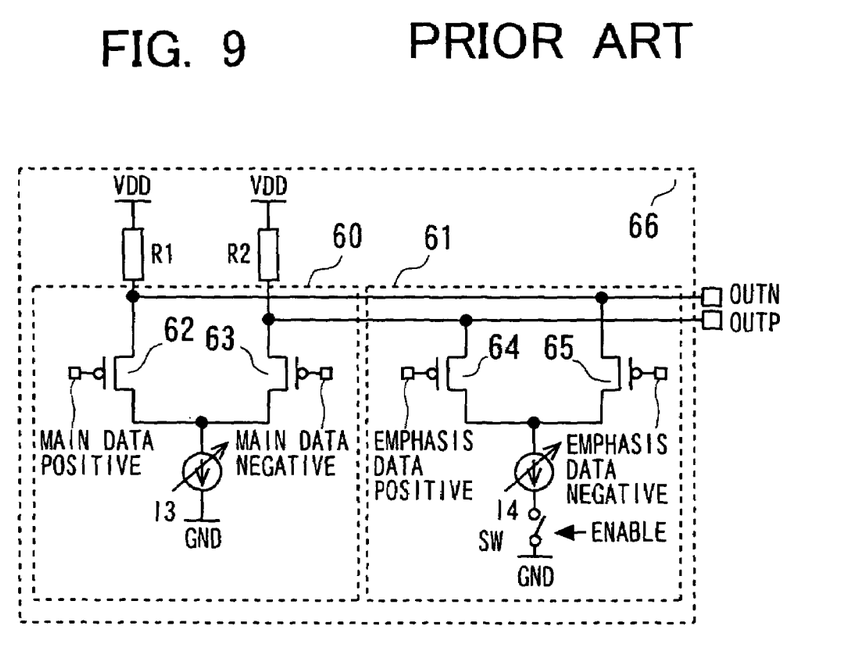
FIG. 9 is a diagram showing the configuration of a circuit 50 in FIG. 8.

FIG. 9 is a diagram showing an example of the configuration of the main-data main buffer 51 and the de-emphasis main buffer 52 shown in FIG. 8. In FIG. 9, the buffer 51 in FIG. 8 corresponds to a circuit 60 and the buffer 52 in FIG. 8 corresponds to circuit 61.

Referring to FIG. 9, the configuration comprises N-channel MOS transistors 62 and 63 which have sources connected in common to a constant current source I3 (current value is variably controlled) and which have gates for receiving the non-inverting signal (Main data positive) and the inverting signal (Main data negative) of the main data 57 in FIG. 8 respectively; and N-channel MOS transistors 64 and 65 which have sources connected in common to a constant current source I4 (current value is variably controlled) and which have gates for receiving the non-inverting signal (Emphasis data positive) and the inverting signal (Emphasis data negative) of the emphasis data 58 in FIG. 8 respectively. The drain of the transistor 62 and the drain of the transistor 65 are connected in common to the inverting terminal OUTN and, via a resistor R1, connected to the power supply VDD, and the drain of the transistor 63 and the drain of the transistor 64 are connected in common to the non-inverting terminal OUTP and, via a resistor R2, connected to the power supply VDD. The constant current source I4 and a switch SW are connected in series between the coupled source of the N-channel MOS transistors 64 and 65 and the ground and, when emphasis is disabled, the control signal ENABLE is inactive and the switch SW is off. The following describes the operation when emphasis is enabled (control signal ENABLE is active and switch SW is on). In the description below, a high level is a logic value 1, and a low level is a logic value 0.

When the non-inverting signal and the inverting signal of the main data 57 are 1 and 0 and the non-inverting signal and the inverting signal of the emphasis data 58 are 0 and 1 (non-inverting signal of main data 57 is the transition bit that changes from 0 to 1), the transistors 62 and 65 whose drains are connected in common are turned on, the transistors 63 and 64 are turned off, and the current corresponding to the sum of the currents of the current sources I3 and I4 flows through the resistor R1. OUTN=VDD−(I3+I4)×R1 and OUTP=VDD and the amplitude of the output signal is OUTP−OUTN=(I3+I4)× R1.

When the non-inverting signal and the inverting signal of the main data 57 are 1 and 0 and the non-inverting signal and the inverting signal of the emphasis data 58 are 1 and 0, the transistors 62 and 64 are turned on, the transistors 63 and 65 are turned off, and the currents corresponding to I3 and I4 flows through the resistors R1 and R2. Because the voltage difference between OUTP and OUTN is calculated from OUTN=VDD−R1×I3 and OUTP=VDD−R2×I4, the amplitude of the output signal is OUTP−OUTN=R1×I3−R2×I4. When R1=R2=R, OUTP−OUTN=R×(I3−I4) and the circuit in FIG. 9 becomes a subtraction circuit. The amplitude of OUTP−OUTN becomes smaller than that of the transition bit ((I3+I4)×R1), indicating that de-emphasis is performed.

When the non-inverting signal and the inverting signal of the main data 57 are 0 and 1 and the non-inverting signal and the inverting signal of the emphasis data 58 are 1 and 0 (non-inverting signal of main data 57 is the transition bit that changes from 1 to 0), the transistors 63 and 64 are turned on, the transistors 62 and 65 are turned off, and the current corresponding to the sum of the currents of I3 and I4 flows through the resistor R2. OUTP=VDD−(I3+I4)×R2 and OUTN=VDD and the amplitude of the output signal is OUTP−OUTN−(I3+I4)×R2. When the non-inverting signal and the inverting signal of the main data 57 are 0 and 1 and the non-inverting signal and the inverting signal of the emphasis data 58 are 0 and 1, the transistors 63 and 65 are turned on, the transistors 62 and 64 are turned off, and the currents corresponding to I4 and I3 flow through the resistors R1 and R2. Because the voltage difference between OUTP and OUTN is calculated from OUTN=VDD−R1×I4 and OUTP=VDD−R2×I3, the amplitude of the output signal is OUTP−OUTN=R1×I4−R2×I3. When R1=R2=R, OUTP−OUTN=R×(I4−I3) and the circuit in FIG. 9 becomes a subtraction circuit. The amplitude of OUTP−OUTN becomes smaller than that of the transition bit, indicating that de-emphasis is performed.

When emphasis is disabled, the differential circuit 61 is inactive and only the differential circuit 60 is active.

The transistors 62 and 63 of the differential circuit 60 have respective circuit sizes that can drive the transmission line only by the differential circuit 60 when de-emphasis is disabled, and the circuit size of the circuit 61 is determined by the drive current determined by the de-emphasis level.

When de-emphasis is enabled (control signal ENABLE is active), the current of the constant current source I3 of the differential circuit 60 and current of the constant current source I4 of the differential circuit 61 are the current values having the relation of a ratio determined by the de-emphasis level. When de-emphasis is disabled, the current for driving the transmission line flows only through the constant current source I3 but not through the constant current source I4.

If the circuit is configured in such a way that the amplitude of the transition bit is equal regardless of whether de-emphasis is enabled or disabled, the current is controlled so that the current value I of the sum of the constant current source I3 and the constant current source I4 when de-emphasis is enabled becomes equal to the current value I of the constant current source I3 when de-emphasis is disabled. For example, when de-emphasis is disabled (circuit 61 is inactive), the current value is variably controlled so that the constant current source I3 of the circuit 60 becomes equal to the sum value I of the constant current source I3 and the constant current source I4 when de-emphasis is enabled.

Let A be driving power (driving current, circuit size) required to drive transmission line,
  B be driving power of circuit 60,
  C be driving power of circuit 61, and
D be the emphasis level ([dB]) required when emphasis is enabled, we have the following equations (1) and (2):

$$A=B \tag{1}$$

$$D=20*\log[(B-C)/(B+C)] \ (B>C) \tag{2}$$

Let's substitute the variables in the equations (1) and (2) with actual numeric values.

If A=120 and D=−3.5[dB], B and C are determined as B=120 and C=24 from the equations (1) and (2). The ratio of driving powers B:C between the circuits 60 and 61 becomes 5:1.

If A=120 and D=−6[dB], B and C are determined as B=120 and C=40 from the equations (1) and (2). The ratio of driving powers B:C between the circuits 60 and 61 becomes 3:1.

As described above, if the de-emphasis level is −3.5[dB] and [dB], the ratios of driving powers between the circuits 60 and 61 become 5:1 and 3:1, respectively. That is, as the de-emphasis level becomes higher, the size of the de-emphasis main buffer size becomes larger and, accordingly, the size of the pre-buffer size becomes larger.

[Patent Document 1]
  Japanese Patent Kokai Publication No. JP-P2004-88693A

[Patent Document 2]
  Japanese Patent Kokai Publication No. JP-P2002-94365A

SUMMARY OF THE DISCLOSURE

When de-emphasis is disabled, it is necessary that, with the de-emphasis main buffer set in the disable state, the main-data main buffer has the driving power (circuit size) to drive the transmission line alone. This makes the main buffer and large pre-buffer large and generates a problem that the efficiency of layout area and the power efficiency are greatly deteriorated.

In addition, as the de-emphasis level becomes larger, the de-emphasis output buffer (main buffer and pre-buffer) circuit size becomes larger.

As described above, when the de-emphasis main buffer and the main-data main buffer are designed for dedicated use, the de-emphasis main buffer is not used in the operation when de-emphasis is disabled. Therefore, the main-data main buffer is required to have the driving power (circuit size) large enough to drive the transmission line alone.

The problem is that an increase in the main buffer size and the pre-buffer size greatly reduces the efficiency of the layout area and the power.

The problems described above are solved by the present invention which is configured as follows.

A device according to one aspect of the present invention comprises a first output buffer for data that receives a data signal and outputs the data signal from an output terminal; a second output buffer whose output end is connected to the output terminal; and a selection circuit that receives a control signal indicating whether de-emphasis is enabled or disabled and performs switching control in such a way that, when the control signal indicates that de-emphasis is disabled, the data signal is supplied to an input end of the second output buffer to make the second output buffer operate as a buffer for data and when the control signal indicates that de-emphasis is enabled, emphasis data obtained on delaying the data signal, is supplied to the input end of the second output buffer to make the second output buffer operate as a buffer for de-emphasis.

In accordance with the present invention, the data signal comprises a differential signal, the first output buffer comprises a first pre-buffer, composed of a differential circuit, and a first main buffer composed of a differential circuit that receives an output from the first pre-buffer, the second output buffer comprises a second main buffer composed of a differential circuit, a non-inverting output and an inverting output of a differential output of the first main buffer and an inverting output and a non-inverting output of a differential output of the second main buffer are connected in common respectively, the selection circuit receives a differential signal obtained on inverting the data signal, and a differential signal obtained on delaying the data signal by a delay circuit and, when the control signal indicates that de-emphasis is enabled, differentially supplies the signal obtained on delaying the data signal by the delay circuit, to the input terminal of the second main buffer, and when the control signal indicates that de-emphasis is disabled, supplies the signal obtained on inverting the data signal, to the second main buffer, to make the first and second main buffers operate as an adder and to make the second output buffer operate as a main-data output buffer.

A device according to another aspect of the present invention comprises a first buffer that differentially receives a data signal and differentially outputs the data signal; and a second buffer and a third buffer, wherein a non-inverting output and an inverting output of the first buffer are connected in common to an inverting output and a non-inverting output of the second and third buffers respectively. The output buffer circuit further includes a delay circuit that delays the data signal; a first selection circuit that receives a signal obtained on inverting the data signal and an output of the delay circuit and, based on a first selection control signal, outputs one of them to the second buffer; and a second selection circuit that receives the signal obtained on inverting the data signal and the output of the delay circuit and, based on a second selection control signal, outputs one of them to the third buffer.

A device according to another aspect of the present invention comprises an inverter circuit that receives and outputs a data signal; a first inverting-type output buffer that receives the output from the inverter circuit as an input and outputs the input from an output terminal; a delay circuit that delays the data signal; a selection circuit that receives an output of the delay circuit and the output of the inverter circuit, receives a control signal indicating whether de-emphasis is to be enabled or disabled, selects and outputs the output of the inverter circuit when the control signal indicates that de-emphasis is to be disabled, and selects and outputs the output of the delay circuit when the control signal indicates that de-emphasis is to be enabled; and a second inverting-type output buffer which receives the output of the selection circuit as an input and whose output is connected in common with the output of the first inverting-type output buffer.

According to the present invention, the de-emphasis output buffer, which is one of the main-data output buffer (main buffer and pre-buffer) and the de-emphasis output buffer (main buffer and pre-buffer) constituting the output buffer with the de-emphasis (also called "pre-emphasis") function, operates as the main-data output buffer when de-emphasis is disabled.

The meritorious effects of the present invention are summarized as follows.

In accordance with the present invention, the de-emphasis output buffer can be used as the main-data output buffer when the de-emphasis is disabled to optimize the entire circuit including a pre-buffer, to reduce the number of circuit elements, and to reduce power consumption.

Still other features and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Figure 1:
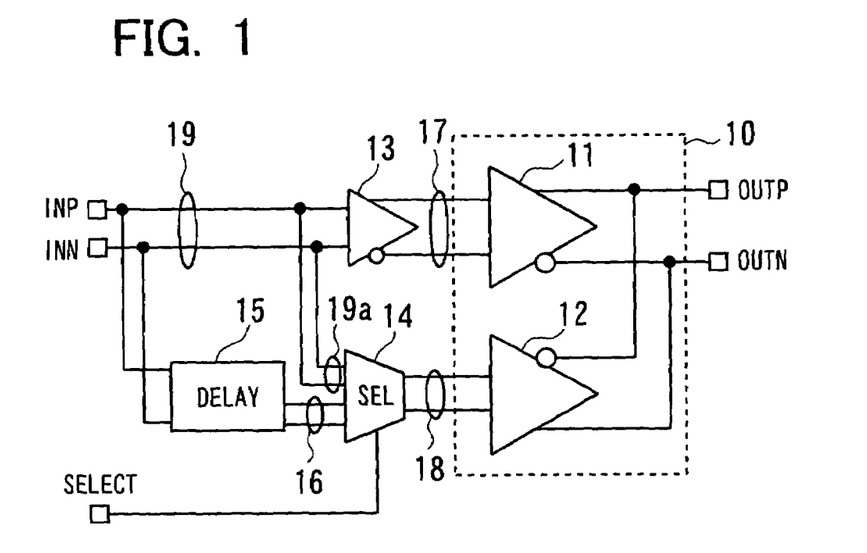
FIG. 1 is a diagram showing the configuration of one embodiment of the present invention.

The preferred embodiments of the present invention will be described in detail with reference to the attached drawings. Referring to FIG. 1, an output buffer circuit of the present invention includes main-data output buffers (13, 11), a de-emphasis output buffer (12), and a selector (14) that performs switching control in such a way that it receives a control signal (SELECT) indicating whether de-emphasis is to be enabled or disabled, supplies main data to the de-emphasis output buffer (12) to make the de-emphasis output buffer operate as a main-data output buffer when the control signal indicates that de-emphasis is to be disabled, and supplies emphasis data obtained on delaying the main data by the delay circuit (15), to the de-emphasis output buffer (12) to make the de-emphasis output buffer operate as a de-emphasis output buffer when the control signal indicates that de-emphasis is to be enabled.

Figure 3:
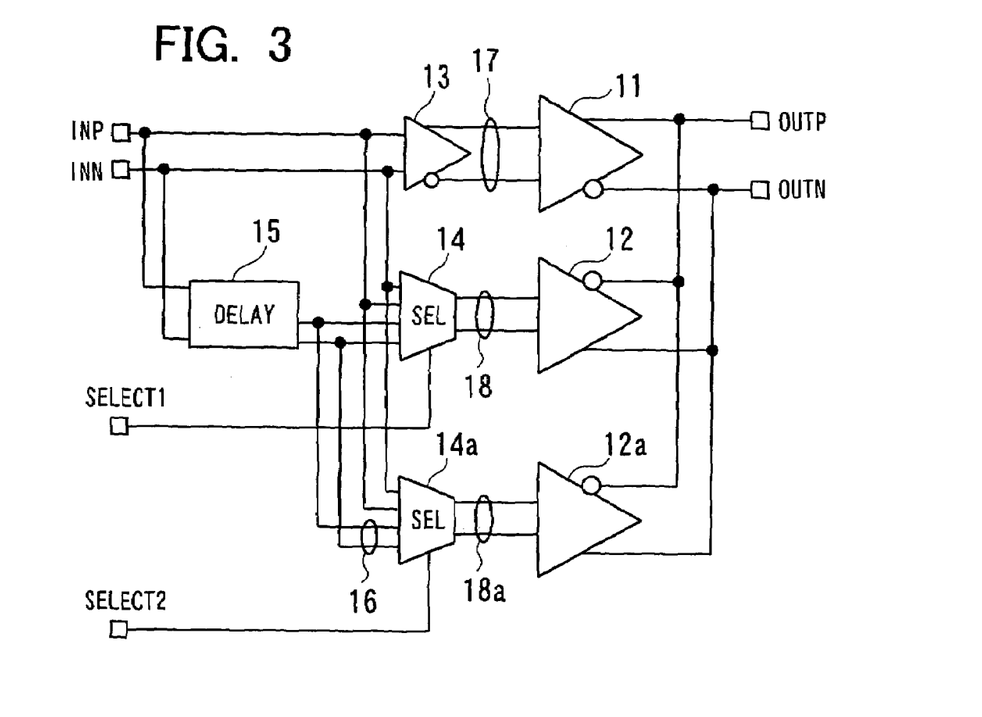
FIG. 3 is a diagram showing the configuration of another embodiment of the present invention.

Referring to FIG. 3, a circuit in another embodiment of the present invention includes a first buffer (11) that differentially receives a data signal and differentially outputs the data signal; and a second buffer and a third buffer (12 and 12a), wherein a non-inverting output and an inverting output of the first buffer (11) are connected in common to an inverting output and a non-inverting output of the second and third buffers (12 and 12a) respectively. The output buffer circuit further includes a delay circuit (15) that delays the data signal; a first selection circuit (14) that receives a signal obtained on inverting the data signal and an output of the delay circuit and, based on a first selection control signal (SELECT1), outputs one of them to the second buffer; and a second selection circuit (14a) that receives the signal obtained on inverting the data signal and the output of the delay circuit and, based on a second selection control signal (SELECT2), outputs one of them to the third buffer.

Figure 4:
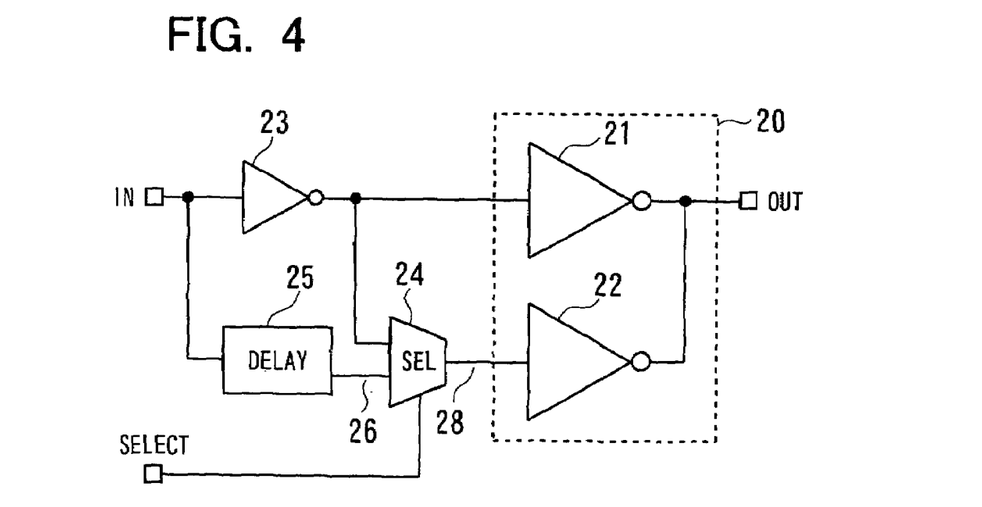
FIG. 4 is a diagram showing the configuration of still another embodiment of the present invention.

Referring to FIG. 4, a circuit in still another embodiment of the present invention includes an inverter circuit (23) that receives and outputs a data signal; a first inverting-type output buffer (21) that receives the output from the inverter circuit as an input and outputs the input from an output terminal; a delay circuit (25) that delays the data signal; a selection circuit (24) that receives an output of the delay circuit and the output of the inverter circuit, receives a control signal (SELECT) indicating whether de-emphasis is to be enabled or disabled, selects and outputs the output of the inverter circuit when the control signal indicates that de-emphasis is to be disabled, and selects and outputs the output of the delay circuit when the control signal (SELECT) indicates that de-emphasis is to be enabled; and a second inverting-type output buffer (22) which receives the output of the selection circuit (24) as an input and whose output is connected in common with the output of the first inverting-type output buffer (21). The following describes the embodiments more in detail.

FIG. 1 is a diagram showing the configuration of one embodiment of the present invention. Referring to FIG. 1, an output buffer circuit according to the present embodiment comprises a pair of differential input terminals (INP/INN) that differentially receive a data signal; a main data pre-buffer 13 that differentially receives a data signal 19 input at the differential input terminals (INP/INN); a main-data main buffer 11 that differentially receives a differential output 17 of the main data pre-buffer 13; a delay circuit 15 that differentially receives the data signal 19 input at the differential input terminals (INP/INN), delays the signal, and outputs the delayed signal; a selection circuit 14 that receives a differential output 16 from the delay circuit 15 and an inverting signal 19a (differential signal generated by exchanging non-inverting signal and inverting signal) of the differential data signal 19 input at the differential input terminals (INP/INN) and outputs one of the differential signals based on the control signal SELECT; and a main buffer (referred to as de-emphasis main buffer) 12 that differentially receives an output signal 18 of the selection circuit 14.

The non-inverting output of the main-data main buffer 11 and the inverting output (indicated by a circle) of the de-emphasis main buffer 12 are connected in common to a non-inverting terminal OUTP, and the inverting output (indicated by a circle) of the main-data main buffer 11 and the non-inverting output of the de-emphasis main buffer 12 are connected in common to an inverting terminal OUTN. The main-data main buffer 11 and the de-emphasis main buffer 12 work together to increase the amplitude when the logic of the signal to be output (OUTP/OUTN) is changed and outputs the emphasized signal.

The sum of the driving power of the main-data main buffer 11 and that of the de-emphasis main buffer 12 is a driving power required to drive the transmission line. The driving power (circuit size) of the main-data main buffer 11 and that of the de-emphasis main buffer 12 are determined by the ratio of the required de-emphasis level.

The amplitude of the transition bit, which is the first bit signal immediately after the logic of the signal output at a pair of differential output terminals (OUTP/OUTN) from the main buffers is changed, is the same, regardless of whether the de-emphasis is enabled or disabled.

The amplitude of non-transition bit, which is the signal after the transition bit and has the same logic as that of the transition bit, is attenuated.

When the control signal SELECT indicates that de-emphasis is to be enabled, the selection circuit 14 selects the signal 16 from the delay circuit 15.

When the control signal SELECT indicates that de-emphasis is to be disabled, the selection circuit 14 selects the inverting signal 19a of the received differential signal (INP/INN) 19. The signal from the non-inverting input terminal INP and the signal from the inverting input terminal INN are in a cross coupled configuration supplied to the inverting input terminal and the non-inverting input terminal of the selection circuit 14, respectively. The output of the selection circuit 14 is supplied to the de-emphasis main buffer 12.

When de-emphasis is enabled, a circuit 10 performs subtraction between the differential signal 17, which is input at the differential input terminals (INP/INN) and output from the pre-buffer 13, and the differential signal 16, which is input at the differential input terminals (INP/INN) and delayed by the delay circuit 15, and outputs a signal whose amplitude is emphasized when the logic of the signal is changed.

On the other hand, when de-emphasis is disabled, the main buffer circuit 10 performs subtraction between the differential data signal 19, which is input at the differential input terminals (INP/INN), and the inverting signal 19a of the differential data signal 19, that is, adds up respectively the inverting signal and non-inverting signal of the differential data signals 19. That is, the main buffer circuit 10 does not output attenuated signals but always outputs a signal which is of the same amplitude between a-transition bit and a non-transition bit.

When de-emphasis is disabled in the present embodiment, the de-emphasis output main buffer 12 works as a main-data output buffer.

Figure 2:
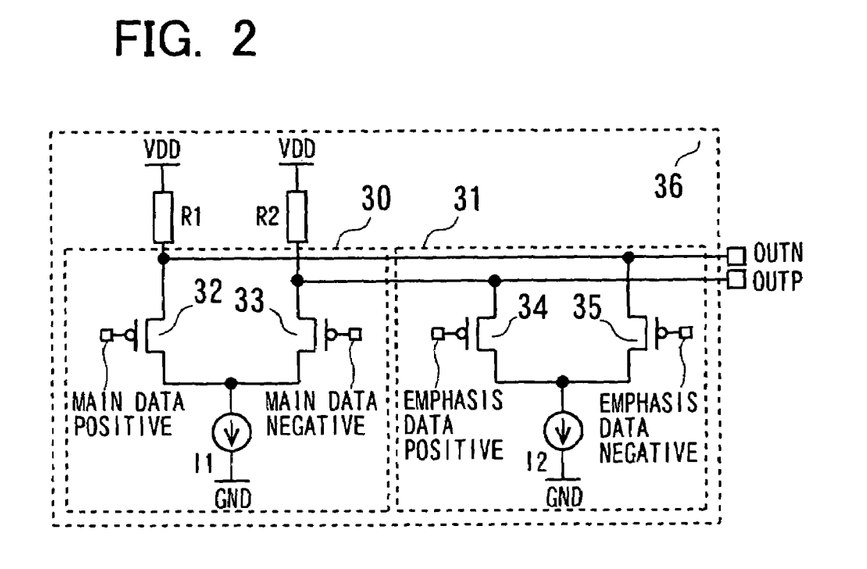
FIG. 2 is a diagram showing the configuration of a circuit 10 in FIG. 1.

FIG. 2 is a diagram showing one embodiment of the configuration of the circuit 10 in FIG. 1, and the numeral 36 in FIG. 2 corresponds to the circuit 10 in FIG. 1. When the circuit is used as a differential output buffer, the main-data main buffer 11 and the de-emphasis main buffer 12 comprise a circuit 30 and a circuit 31, respectively.

Referring to FIG. 2, the configuration comprises N-channel MOS transistors 32 and 33 having sources connected in common to a constant current source I1 and having gates supplied with the non-inverting signal (Main data positive) and the inverting signal (Main data negative) of the main data 17, respectively; and N-channel MOS transistors 34 and 35 having sources connected in common to a constant current source I2 and having gates supplied with the non-inverting signal and the inverting signal of the output 18 of the selection circuit 14, respectively. The drain of the transistor 32 and the drain of the transistor 35 are connected in common to the inverting terminal OUTN and, via a resistor R1, connected to the power supply VDD, and the drain of the transistor 33 and the drain of the transistor 34 are connected in common to the non-inverting terminal OUTP and, via a resistor R2, connected to the power supply VDD.

Referring to FIG. 1 and FIG. 2, the following describes the operation when de-emphasis is enabled. When de-emphasis is enabled, a circuit 36 performs subtraction between two signals, made up of the differential signal 17 which is supplied to the differential input terminals (INP/INN) and output from the pre-buffer 13 in FIG. 1 and the differential signal 18 which is supplied to the differential input terminals (INP/INN) and delayed by the delay circuit 15 and outputs a signal whose amplitude is emphasized when the logic of the signal is changed. In the description below, the high level is represented by the logic value of 1, and the low level is represented by logic value of 0.

When the non-inverting signal and the inverting signal of the main data 17 is 1 and 0 and the non-inverting signal and the inverting signal of the output 18 of the selection circuit 14 (output 16 of delay circuit 15) are 0 and 1 (non-inverting signal of main data 17 is the transition bit that changes from 0 to 1), the transistors 32 and 35 whose drains are connected in common are turned on, the transistors 33 and 34 are turned off, and the current corresponding to the sum of the currents of the current sources I1 and I2 flows through the resistor R1. OUTN=VDD−(I1+I2)×R1 and OUTP=VDD and the amplitude (potential difference between OUTP and OUTN) is OUTP−OUTN=(I1+I2)×R1.

When the non-inverting signal and the inverting signal of the main data 17 are 1 and 0 and the non-inverting signal and the inverting signal of the output 18 of the selection circuit 14 (output 16 of delay circuit 15) are 1 and 0, the transistors 32 and 34 are turned on, the transistors 33 and 35 are turned off, and the current corresponding to the current sources I1 and I2 flows through the resistors R1 and R2. Because OUTN=VDD−R1×I1 and OUTP=VDD−R2×I2, the amplitude is OUTP−OUTN=R1×I1−R2×I2.

When R1=R2=R, OUTP−OUTN=R×(I1−I2). The amplitude of OUTP−OUTN becomes smaller than that of the transition bit, indicating that de-emphasis is performed.

When the non-inverting signal and the inverting signal of the main data 17 is 0 and 1 and the non-inverting signal and the inverting signal of the output 18 of the selection circuit 14 (output 16 of delay circuit 15) are 1 and 0 (non-inverting signal of main data 17 is the transition bit that changes from 1 to 0), the transistors 33 and 34 are turned on, the transistors 32 and 35 are turned off, and the current corresponding to the sum of the currents of the current sources I1 and I2 flows through the resistor R2. OUTP=VDD−(I1+I2)×R2 and OUTN=VDD and, therefore, the amplitude (potential difference between OUTP and OUTN) is OUTP−OUTN=−(I1+I2)×R2.

When the non-inverting signal and the inverting signal of the main data 17 are 0 and 1 and the non-inverting signal and the inverting signal of the output 18 of the selection circuit 14 (output 16 of delay circuit 15) are 0 and 1, the transistors 33 and 35 are turned on, the transistors 32 and 34 are turned off, and the current corresponding to the current sources I2 and I1 flows through the resistors R1 and R2. Because the voltage difference between OUTP and OUTN is calculated from OUTN=VDD−R1×I2 and OUTP=VDD−R2×I1, the amplitude is OUTP−OUTN=R1×I2−R2×I1. When R1=R2=R, OUTP−OUTN=R×(I2−I1). The amplitude of OUTP−OUTN becomes smaller than that of the transition bit, indicating that de-emphasis is performed.

Next, with reference to FIG. 1 and FIG. 2, the following describes the operation when de-emphasis is not selected (SELECT selects inverting signal 19a).

When the non-inverting signal and the inverting signal of the main data 17 are 1 and 0 respectively, the non-inverting signal and the inverting signal of the output 18 of the selection circuit 14 (inverting signal 19a of differential data signal 19) are 0 and 1 respectively, the transistors 32 and 35 with drains thereof connected in common are turned on, the transistors 33 and 34 are turned off, and the current corresponding to the sum of the currents I1 and I2 flows through the resistor R1.

OUTN=VDD−(I1+I2)×R1 and OUTP=VDD and, therefore, the amplitude becomes OUTP−OUTN=(I1+I2)×R1.

When the non-inverting signal and the inverting signal of the main data 17 are 0 and 1, respectively, and the non-inverting signal and the inverting signal of the output 18 of the selection circuit 14 (inverting signal 19a of differential data signal 19) are 1 and 0 respectively, the transistors 33 and 34 are turned on, the transistors 32 and 35 are turned off, and the current corresponding to the sum of the currents I1 and I2 flows through the resistor R2. OUTP=VDD−(I1+I2)×R2 and OUTN=VDD and, therefore, the amplitude becomes OUTP−OUTN=(I1+I2)×R2.

For a non-transition bit whose output signal value does not change, the amplitude also remains emphasized.

The transistor size ratio between the N-channel MOS transistors 32 and 33 and the N-channel MOS transistors 34 and 35 and the current ratio between the current sources I1 and I2 are determined by the required emphasis level, and the sum of the transistor sizes and the sum of the currents for driving are determined by the driving power required for driving the transmission line when de-emphasis is disabled.

The driving current of each main buffer determined as described above is fixed regardless of whether de-emphasis is enabled or disabled. However, for an output buffer with a configuration in which the output amplitude is variable regardless of whether emphasis is enabled or disabled, the current varies according to the controlled amplitude but the ratio between I1 and I2 is fixed.

The following shows an example of actual ratio calculation.

Let A be the sum of driving powers (driving current, circuit size) required to drive transmission line when de-emphasis is disabled, B be driving power of circuit 30, C be driving power of circuit 31, and D be the emphasis level [dB] required when emphasis is enabled, we have the following equations (3) and (4):

$$A=B+C \qquad (3)$$

$$D=20*\log[(B-C)/(B+C)] \ (B>C) \qquad (4)$$

The present embodiment comprises the main-data main buffer 11 and the de-emphasis main buffer 12 that satisfy the equations described above.

Let's substitute the variables with actual numeric values to find the size ratio between the main-data main buffer 11 and the de-emphasis main buffer 12.

If A=120 and D=−3.5[dB], B=100 and C=20 from the equations (3) and (4). The size ratio between the main-data main buffer 11 and the de-emphasis main buffer 12 becomes 5:1.

If A=120 and D=−6[dB], B=90 and C=30. The size ratio between the main-data main buffer 11 and the de-emphasis main buffer 12 becomes 3:1.

As described above, the circuit size of the whole main buffer is determined by the driving power required for driving the transmission line. The ratio between the sizes of the pre-buffers (numeral 13 in FIG. 1 and an output buffer in selection circuit 14 not shown), which drive the main-data main buffer 11 and the de-emphasis main buffer 12 designed based on the ratio determined by the required de-emphasis level, is also almost equal to the ratio between the main buffers 11 and 12.

Figure 6:
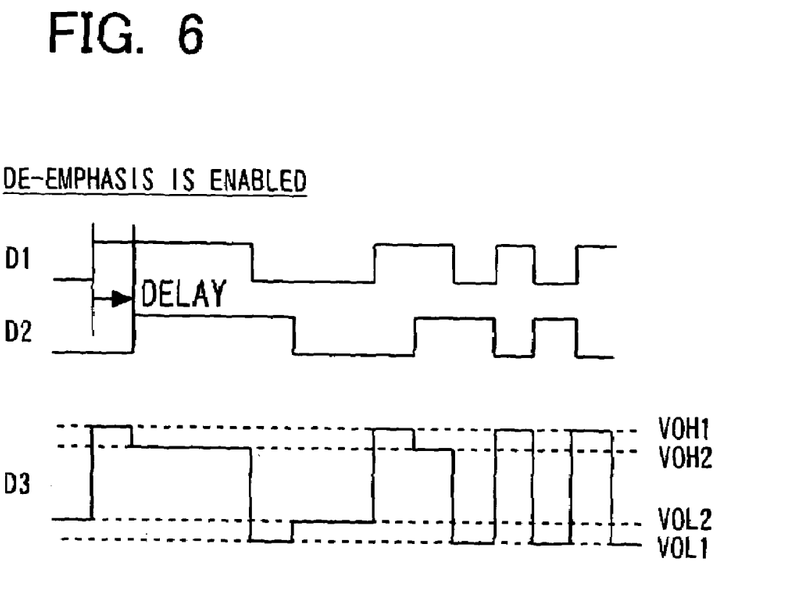
FIG. 6 is a diagram showing the operation when de-emphasis is enabled in one embodiment of the present invention.
Figure 7:
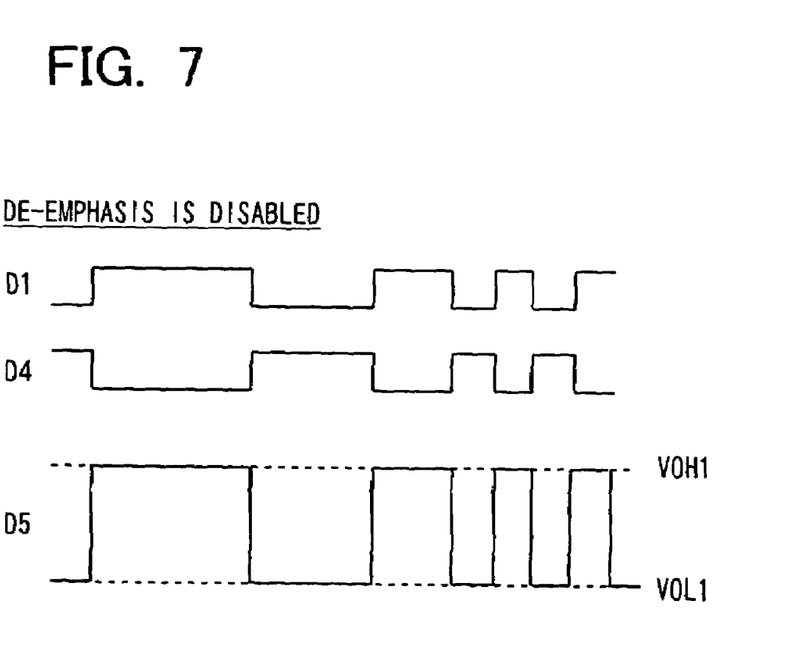
FIG. 7 is a diagram showing the operation when de-emphasis is disabled in one embodiment of the present invention.

FIG. 6 and FIG. 7 are waveform diagrams schematically showing the relation between the logic of the signals supplied to the main buffer 11 and the main buffer 12 and the logic and amplitude of the signals output from those buffers (for simplicity, only the non-inverting signals are shown).

FIG. 6 shows the waveforms when de-emphasis is enabled. The signal D1 is the signal supplied to the main buffer 11, the signal D2 is a signal generated by delaying the signal D1 by the delay circuit 15 for the delay time ('delay' shown in FIG. 6) and then supplied to the main buffer 12, and the signal D3 is the output of the circuit 10. As shown in FIG. 6, the circuit 10 performs subtraction between the signal D1 and the signal D2 and outputs the output signal whose amplitude is emphasized when the signal logic is changed as shown by D3.

On the other hand, FIG. 7 shows the waveforms when de-emphasis is disabled. The signal D1 is the signal supplied to the main buffer 11, the signal D4 is the inverting signal of D1, selected by the selection circuit 14, and is supplied to the main buffer 12, and the signal D5 is the output of the circuit 10. The circuit 10 performs subtraction between the signal D1 and the signal D4. As shown by the signal D5, the resulting signal has an output signal waveform neither emphasized nor de-emphasized (the amplitude is neither emphasized when the logic of the signal is changed nor de-emphasized in the bit following the transition bit) with the amplitude equal to that of the transition bit when de-emphasis is enabled.

Although one de-emphasis level is set in the description above, the present invention is applicable also to an output buffer circuit for which two or more de-emphasis levels are set.

Next, another embodiment of the present invention will be described. FIG. 3 is a diagram showing the configuration of a second embodiment of the present invention. This circuit is an output buffer circuit for which three types of de-emphasis level can be set. Like a selection circuit 14, a selection circuit 14a is a circuit that selects one of the following two signals based on a control signal SELECT2: a signal delayed by a delay circuit 15 and the inverting signal of original differential data signals 19.

Like a first de-emphasis main buffer 12, a second de-emphasis main buffer 12a is connected in such a way that subtraction is performed between a main-data main buffer 11 and the second de-emphasis main buffer 12a.

When the selection signals SELECT1 and SELECT2 have the logic value of 1 and the signals selected by the selection circuit 14 and selection circuit 14a are the output of the delay circuit 15, three types of emphasis amount can be set by the two-bit binary code. When the selection signals SELECT1 and SELECT2 both have the logic value of 0, the selection circuit 14 and the selection circuit 14a select the inverting signal of the data signal. In this case, the main buffer 12 and the main buffer 12a work with the main buffer 11 as the main-data main buffer.

When the selection signals SELECT1 and SELECT2 have the logic value of 1, the selection circuit 14 and the selection circuit 14a select the output of the delay circuit 15 and the main buffer 12 and the main buffer 12a work as de-emphasis main buffers.

When the selection signal SELECT1 has the logic value of 1 and the selection signal SELECT2 has the logic value of 0, the selection circuit 14 selects the output of the delay circuit 15 and the selection circuit 14a selects the inverting signal of the data signal. The main buffer 12 operates as the de-emphasis main buffer, and the main buffer 12a that works with the main buffer 11 operate as the main-data main buffer.

When the selection signal SELECT1 has the logic value of 0 and the selection signal SELECT2 has the logic value of 1, the selection circuit 14a selects the output of the delay circuit 15 and the selection circuit 14 selects the inverting signal of the data signal. The main buffer 12a operates as the de-emphasis main buffer, and the main buffer 12 that works with the main buffer 11 operates as the main-data main buffer.

By setting the driving power (driving current, circuit size) ratio between the main buffer 11, main buffer 12, and main buffer 12a as 9:2:1, the buffer circuit outputs the following emphasis level.

When [SELECT1, SELECT2]=[0,1]

$20 \times \log [(9+2-1)/(9+2+1)] = -1.6[dB]$

When [SELECT1, SELECT2]=[1,0]

$20 \times \log [(9-2+1)/(9+2+1)] = -3.5[dB]$

When [SELECT1, SELECT2]=[1,1]

$20 \times \log [(9-2-1)/(9+2+1)] = -6.0[dB]$

Conversely, it is also possible to determine the driving power of the main buffer 11, main buffer 12, and main buffer 12a from a required de-emphasis level.

In any setting, the first de-emphasis main buffer and the second de-emphasis main buffer are always in operation and the driving current flows.

The present invention is applicable also to an output buffer operating on a single-phase signal. FIG. 4 is a diagram showing the configuration of a third embodiment of the present invention. Referring to FIG. 4, the output buffer circuit comprises an inverter 23 that inverts a data signal received by an input terminal IN; a main-data main buffer (inverter) 21 that receives the output of the inverter 23; a delay circuit 25 that delays the data signal received by the input terminal IN; a selector 24 that receives the output signal of the inverter 23 and the output of the delay circuit 25 and selects one of them based on the selection control signal SELECT; and a de-emphasis main buffer (inverter) 22 that receives the output of the selector 24.

Figure 5:
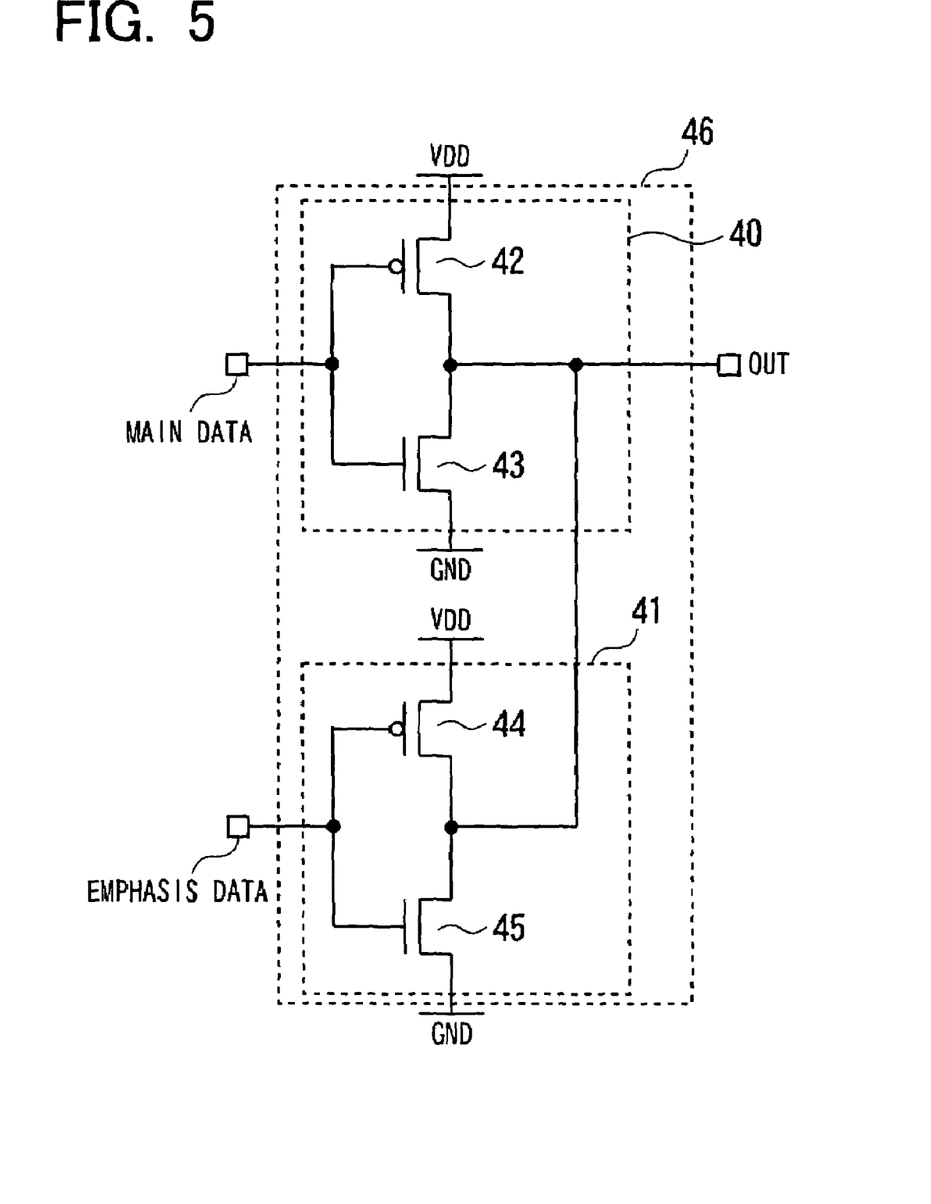
FIG. 5 is a diagram showing the configuration of a circuit 20 in FIG. 4.

FIG. 5 is a diagram showing an example of a main buffer 20 comprising the main-data main buffer (inverter) 21 and the de-emphasis main buffer (inverter) 22 in FIG. 4. Referring to FIG. 5, the main buffer 21 corresponds to a main buffer 40, and the main buffer 22 corresponds to a main buffer 41. Referring to FIG. 5, the circuit 40 comprises a P-channel MOS transistor 42 whose source is connected to the power supply VDD and an N-channel MOS transistor 43 whose source is connected to GND. The gates and the drains of the P-channel MOS transistor 42 and the N-channel MOS transistor 43 are connected in common to the main data terminal (Main data) and the output terminal OUT, respectively. The circuit 41 comprises a P-channel MOS transistor 44 whose source is connected to the power supply VDD and an N-channel MOS transistor 45 whose source is connected to GND. The gates and the drains of the P-channel MOS transistor 44 and the N-channel MOS transistor 45 are connected in common to the emphasis data terminal (Emphasis data) and the output terminal OUT, respectively.

With reference to FIG. 4 and FIG. 5, the operation of the present embodiment will be described. First, the following describes the operation when de-emphasis is disabled. In the description below, the high level is represented by the logic value of 1, and the low level is represented by logic value of 0.

When de-emphasis is disabled, the selector 24 in FIG. 4 selects the output signal of the inverter 23. When the input signal has the logic value of 1, the main-data main buffer 21 outputs the logic value of 1 and the de-emphasis main buffer 22 outputs the logic value of 1. The de-emphasis main buffer 22 functions as the main-data main buffer, and the transmission line is driven by the driving power of the two main buffers. When the input signal has the logic value of 0, the main-data main buffer 21 outputs the logic value of 0 and the de-emphasis main buffer 22 outputs the logic value of 0. The de-emphasis main buffer 22 functions as the main-data main buffer, and the transmission line is driven by the driving power of the two main buffers.

As described above, when de-emphasis is disabled, "Emphasis data" of the de-emphasis main buffer 41 in FIG. 5 receives the same signal as "Main data" of the main-data main buffer 40.

Next, the following describes the operation when de-emphasis is enabled. When de-emphasis is enabled, the selector 24 selects the output of the delay circuit 25. When the logic value of the input signal is changed from 0 to 1, the main-data main buffer 21 outputs the logic value of 1 and, at the same time, the de-emphasis main buffer 22 receives the delayed output 0 from the delay circuit 25, inverts the received value, and outputs the logic value of 1. Thus, when the logic of the signal is changed (transition bit), the amplitude is emphasized to the power supply potential (VDD) side. Referring to FIG. 5, the P-channel MOS transistor 42 is turned on and the N-channel MOS transistor 43 is turned off in the main-data main buffer 40, and the P-channel MOS transistor 44 is turned on and the N-channel MOS transistor 45 is turned off in the de-emphasis main buffer 41. The power supply voltage VDD is output to the output terminal OUT.

When the next input signal has the logic value of 1, the main-data main buffer 21 outputs the logic value of 1 and, at the same time, the de-emphasis main buffer 22 receives the output signal with the logic value of 1 from the delay circuit 25 and inverts the received value to output the logic value of 0. The amplitude becomes lower than that of the power supply potential VDD. Referring to FIG. 5, the P-channel MOS transistor 42 is turned on and the N-channel MOS transistor 43 is turned off in the main-data main buffer 40, and the N-channel MOS transistor 45 is turned on and the P-channel MOS transistor 44 is turned off in the de-emphasis main buffer 41. The high-level voltage, defined by the on-resistance of the P-channel MOS transistor 42 and the N-channel MOS transistor 45, is output to the output terminal OUT.

When the logic value of the input signal is changed from 1 to 0, the main-data main buffer 21 outputs the logic value of 0 and, at the same time, the de-emphasis main buffer 22 receives the delayed output 1 from the delay circuit 25, inverts the received value, and outputs the logic value of 0. Thus, when the logic of the signal is changed (transition bit), the amplitude is emphasized to the GND side. Referring to FIG. 5, the P-channel MOS transistor 42 is turned off and the N-channel MOS transistor 43 is turned on in the main-data main buffer 40, and the P-channel MOS transistor 44 is turned off and the N-channel MOS transistor 45 is turned on in the de-emphasis main buffer 41. The GND potential is output to the output terminal OUT.

When the next input signal has the logic value of 0, the main-data main buffer 21 outputs the logic value of 0 and, at the same time, the de-emphasis main buffer 22 receives the output signal 0 from the delay circuit 25, and inverts the received signal to output the logic value of 1. The amplitude becomes higher than that of GND. Referring to FIG. 5, the P-channel MOS transistor 42 is turned off and the N-channel MOS transistor 43 is turned on in the main-data main buffer 40, and the N-channel MOS transistor 45 is turned off and the P-channel MOS transistor 44 is turned on in the de-emphasis main buffer 41. The low-level voltage, defined by the on-resistance of the P-channel MOS transistor 44 and the N-channel MOS transistor 43, is output to the output terminal OUT. Note that the current driving power of the transistors 44 and 45 in the de-emphasis main buffer 41 is set lower than the current driving power of the transistors 42 and 43 in the main-data main buffer 40 according to the de-emphasis amplitude attenuation characteristics.

As with a differential buffer, the circuit size of the whole main buffer is determined by the driving power required for driving the transmission line and the size ratio between the buffer 40 and the buffer 41 is determined by the required de-emphasis level.

In the present embodiment, it is possible to optimize the circuit sizes of the main-data main buffer and the de-emphasis main buffer as well as the circuit sizes of the main-data pre-buffer and the de-emphasis pre-buffer that drive the main buffers and, therefore, it is possible to reduce the layout area and to save the power consumption.

The de-emphasis setting control signal, which determines whether to enable de-emphasis, can cause the de-emphasis pre-buffer and the de-emphasis main buffer to function as the main-data pre-buffer and the main-data main buffer. Thus, when de-emphasis is disabled, the circuit where the main-data main buffer and the de-emphasis main buffers are combined can drive the transmission line. This configuration eliminates the need for a circuit size large enough for driving the transmission line only by the main-data main buffer as in the conventional output buffer, thus making the circuit size smaller.

It is of course possible to apply the differential output buffer circuit in FIG. 3 to the output buffer circuit with the single-end de-emphasis function described with reference to FIG. 4 and FIG. 5. To do so, the output buffer circuit in FIG. 4 further comprises a second selection circuit (corresponds to 14a in FIG. 3), which receives the output of the delay circuit 25 and the output of the inverter 23 and selects one of them based on a second selection control signal, and an inverter (corresponds to 12a in FIG. 3) which receives the output of the second selection circuit and whose output is connected to the output terminal OUT.

Table 1 below shows the comparison of the total size of the main-data main buffer and the de-emphasis main buffer between the circuit of the present invention in FIG. 1 and the circuit of the prior art in FIG. 8.

TABLE 1

|  | −3.5 [dB] | −6.0 [dB] |
| --- | --- | --- |
| Present invention | 120 | 120 |
| Prior art circuit | 144 | 180 |

The present invention enables the same circuit configuration to be used regardless of the de-emphasis level and so prevents an increase in the circuit size. By contrast, in the circuit of the prior art, when the de-emphasis level is increased from −3.5 dB to −6.0 dB, the circuit size increases by 180/144.

The present invention is advantageously applied to the output buffer of a serialization circuit (transmission serial data is output to a transmission line) in the serialization/deserialization (Ser/Des) interface (semiconductor device).

While the present invention has been described with reference to the embodiments above, it is to be understood that the present invention is not limited to the configuration of the embodiments above and that modifications and changes that may be made by those skilled in the art within the scope of the present invention are included.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An output buffer circuit comprising:
a first output buffer for data; and a second output buffer;

said first output buffer and said second output buffer having respective output ends connected to an output terminal of said output buffer circuit; said output buffer circuit receiving a data signal to be output and performing a de-emphasis function in which the amplitude of an output signal emphasized at a transition time when the logic of the output signal is changed, is attenuated when the logic of the output signal following the transition remains unchanged, said output buffer circuit further comprising a circuit for performing switching control in such a way that, when de-emphasis is disabled, said second output buffer is made to operate as an output buffer for data, and when de-emphasis is enabled, said second output buffer is made to operate as an output buffer for de-emphasis.

2. A semiconductor device having said output buffer circuit as set fourth in claim 1.

3. A serial interface circuit having said output buffer circuit as set fourth in claim 1.

4. An output buffer circuit comprising:

a first output buffer for data, receiving a data signal and outputting the data signal from an output terminal thereof;

a second output buffer having an output end connected to said output terminal and a selection circuit, receiving a control signal indicating whether de-emphasis is enabled or disabled, for performing switching control in such a way that, when the control signal indicates that de-emphasis is disabled, said data signal is supplied to an input end of said second output buffer to make said second output buffer operate as a buffer for data; and when the control signal indicates that de-emphasis is enabled, emphasis data obtained on delaying said data signal is supplied to the input end of said second output buffer to make said second output buffer operate as a buffer for de-emphasis.

5. The output buffer circuit according to claim 4, wherein the data signal comprises a differential signal;

said output buffer circuit further comprises a delay circuit differentially receiving the data signal for delaying the data signal to output differentially the delayed signal;

said first output buffer comprises: a first pre-buffer composed of a differential circuit; and a first main buffer composed of a differential circuit that receives an output signal from said first pre-buffer;

said second output buffer comprises a second main buffer composed of a differential circuit;

a non-inverting output and an inverting output of the differential output of said first main buffer and an inverting output and a non-inverting output of the differential output of said second main buffer are connected in common respectively and are connected to a non-inverting terminal and an inverting terminal of a differential output terminal pair; and wherein said selection circuit receives a differential signal obtained on inverting the data signal, and a differential signal obtained on delaying the data signal by said delay circuit;

said selection circuit, when the control signal indicates that de-emphasis is enabled, supplying the signal obtained on delaying the data signal by said delay circuit, to the input end of said second main buffer; while said selection circuit, when the control signal indicates that de-emphasis is disabled, supplying the signal obtained on inverting the data signal to the input end of said second main buffer to make said first and second main buffers operate as an adder and to make said second output buffer operate as a main-data output buffer.

6. The output buffer circuit according to claim 5, further comprising:

a third buffer composed of a differential circuit;

a non-inverting output and an inverting output of the differential output of said first main buffer and an inverting output and a non-inverting output of the differential output of said third buffer being connected in common respectively; and a second selection circuit receiving the differential signal obtained on inverting the data signal, and the differential signal obtained on delaying the data signal by said delay circuit;

said second selection circuit, when a second control signal received indicates that de-emphasis is enabled, supplying the signal obtained on delaying the data signal by said delay circuit, to an input end of said third buffer; while said second selection circuit, when the second control signal received indicates that de-emphasis is disabled, supplying the signal obtained on inverting the data signal to the input end of said third buffer.

7. An output buffer circuit comprising:

an inverter circuit receiving a data signal to output an inverted signal of the a data signal;

a first inverting-type output buffer receiving the output signal from said inverter circuit as an input and outputting the inverted signal from an output terminal thereof;

a delay circuit delaying the data signal;

a selection circuit receiving an output signal of said delay circuit and the output signal of said inverter circuit and receiving a control signal indicating whether de-emphasis is to be enabled or disabled, for selecting the output signal of said inverter circuit for output, when the control signal indicates that de-emphasis is to be disabled, and selecting the output signal of said delay circuit for output, when the control signal indicates that de-emphasis is to be enabled; and a second inverting-type output buffer receiving the output of said selection circuit as an input and having an output connected in common with the output of said first inverting-type output buffer.

8. The output buffer circuit according to claim 7, further comprising:

a second selection circuit receiving the output signal of said delay circuit and the output signal of said inverter circuit and selecting one of the output signals received based on a second control signal received; and a third inverting-type output buffer receiving the output signal of said second selection circuit as an input and having an output connected in common with the output of said first inverting-type output buffer.

* * * * *